United States Patent
Zhang et al.

(10) Patent No.: US 10,923,958 B2
(45) Date of Patent: *Feb. 16, 2021

(54) POWER TRANSMITTER, RESONANCE-TYPE CONTACTLESS POWER SUPPLY AND CONTROL METHOD THEREOF

(71) Applicant: Silergy Semiconductor Technology (Hangzhou) LTD, Hangzhou (CN)

(72) Inventors: Wang Zhang, Hangzhou (CN); Feng Yu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,906

(22) Filed: May 6, 2019

(65) Prior Publication Data

US 2019/0260236 A1    Aug. 22, 2019

Related U.S. Application Data

(63) Continuation of application No. 15/080,809, filed on Mar. 25, 2016, now Pat. No. 10,333,349.

(30) Foreign Application Priority Data

Mar. 27, 2015   (CN) .......................... 201510142815.8

(51) Int. Cl.
| | |
|---|---|
| *H01F 27/42* | (2006.01) |
| *H01F 37/00* | (2006.01) |
| *H01F 38/00* | (2006.01) |
| *H02J 50/12* | (2016.01) |
| *H02J 50/80* | (2016.01) |

(52) U.S. Cl.
CPC .............. *H02J 50/12* (2016.02); *H02J 50/80* (2016.02)

(58) Field of Classification Search
CPC . H02J 5/005; H02J 7/025; H02J 17/00; H01F 38/14; B60L 11/182
USPC .......................................................... 307/104
See application file for complete search history.

(56) References Cited

U.S. PATENT DOCUMENTS

| | | | |
|---|---|---|---|
| 2013/0154382 A1 | 6/2013 | Kurata et al. | |
| 2013/0200719 A1 | 8/2013 | Ishihara et al. | |
| 2014/0184149 A1 | 7/2014 | Jung et al. | |
| 2015/0340881 A1* | 11/2015 | Nakano | H02J 7/025 |
| | | | 307/104 |
| 2015/0364927 A1 | 12/2015 | Yu et al. | |
| 2015/0380947 A1 | 12/2015 | Zhang et al. | |

(Continued)

FOREIGN PATENT DOCUMENTS

| | | |
|---|---|---|
| CN | 102969776 A | 3/2013 |
| CN | 103248132 A | 8/2013 |

(Continued)

*Primary Examiner* — Quan Tra

(57) ABSTRACT

The present disclosure relates to a power transmitter, a resonance-type contactless power supply and a control method. The inverter circuit is controlled to provide a high-frequency AC current with a voltage strength parameter so that a current strength parameter (e.g., a peak value or an effective value of the current) of the AC current flowing through a transmitting coil and that through a receiving coil have a predetermined relationship. Thus, an equivalent load impedance is adjusted so that the system efficiency is optimized.

15 Claims, 5 Drawing Sheets

(56) References Cited

U.S. PATENT DOCUMENTS

2015/0380948 A1    12/2015   Mazaki et al.
2016/0013663 A1    1/2016   Zhang et al.
2016/0028241 A1    1/2016   Ichikawa et al.
2016/0079772 A1    3/2016   Kato
2016/0111891 A1    4/2016   Ayukawa
2017/0008385 A1    1/2017   Fujimoto et al.

FOREIGN PATENT DOCUMENTS

| | | |
|---|---|---|
| CN | 104009555 A | 8/2014 |
| CN | 104037956 A | 9/2014 |
| CN | 104079079 A | 10/2014 |
| CN | 104079081 A | 10/2014 |
| CN | 104682583 A | 6/2015 |
| CN | 104701998 A | 6/2015 |
| JP | 2014155328 A | 8/2014 |

\* cited by examiner

POWER TRANSMITTER, RESONANCE-TYPE CONTACTLESS POWER SUPPLY AND CONTROL METHOD THEREOF

CLAIM OF PRIORITY

This application is a continuation of the following application, U.S. patent application Ser. No. 15/080,809, filed on Mar. 25, 2016, and which is hereby incorporated by reference as if it is set forth in full in this specification, and which also claims priority to Chinese Application No. 201510142815.8, filed on Mar. 27, 2015, which is hereby incorporated by reference.

BACKGROUND OF THE DISCLOSURE

The present disclosure relates to the field of power electronics, and more particularly, to a power transmitter, a resonance-type contactless power supply and a control method thereof.

FIELD OF THE DISCLOSURE

Contactless power supply is widely used in electronic products, especially in low-power electronic products such as cellular phones, MP3 players, digital cameras, laptop computers, and the like, due to their convenience and availability. A conventional resonance-type contactless power supply typically has a resonance and magnetic coupling circuit including a transmitting coil L1 and a receiving coil L2. The transmitting coil L1 and other components in a power transmitter constitute a transmitter-side resonant circuit. The receiving coil L2 and other components in a power receiver constitute a receiver-side resonant circuit. Electric energy is transferred in a contactless manner when the transmitter-side resonant circuit and the receiver-side resonant circuit have the same resonance frequency. The receiver-side resonant circuit is coupled to the transmitter-side resonant circuit by electromagnetic field, and thus resonates when the transmitter-side resonant circuit resonates. Typically, the above resonance frequency is referred to as a self-inductance resonance frequency.

However, there may be varied load when electric energy is supplied. The conventional contactless power supplies cannot maintain system efficiency while the load varies.

BRIEF DESCRIPTION OF THE DISCLOSURE

In view of this, the disclosure provides a power transmitter, a resonance-type contactless power supply and a control method. The resonance-type contactless power supply adjusts an output voltage of the power receiver by regulating current values of the transmitter-side resonant circuit so as to adjust an equivalent load impedance and control the system to operate at optimal efficiency.

According to a first aspect, there is provided a resonance-type contactless power supply, comprising:

an inverter circuit configured to receive electric energy and to generate a first AC current with a voltage strength parameter responding to an inverter control signal;

an impedance conversion network configured to receive the first AC current and to generate a second AC current with a current strength parameter corresponding to a voltage strength parameter of the first AC current;

a transmitter-side resonant circuit comprising a transmitting coil for receiving the second AC current;

a receiver-side resonant circuit comprising a receiving coil which is separated from but electrically coupled to the transmitting coil in a contactless manner, and configured to receive electric energy from the transmitting coil and to generate a third AC current; and a control circuit configured to generate the inverter control signal for maintaining the current strength parameter of the second AC current to be m times of a current strength parameter of the third AC current, wherein m is a square root of a ratio of an equivalent resistance of the receiving coil to an equivalent resistance of the transmitting coil, the voltage strength parameter is a voltage peak or an effective value, and the current strength parameter is a current peak or an effective value.

Preferably, the control circuit comprises:

a receiver-side control circuit configured to obtain a second signal representing the current strength parameter of the third AC current and to transfer it in a contactless manner; and a transmitter-side control circuit configured to receive the second signal, to detect a first signal representing the current strength parameter of the second AC current, and to generate the inverter control signal in accordance with the first signal and the second signal.

Preferably, the receiver-side control circuit comprises:

a second current strength parameter detection circuit configured to detect and to obtain the second signal;

a second wireless communication circuit configured to transfer the second signal wirelessly;

the transmitter-side control circuit comprising:

a first wireless communication circuit configured to receive the second signal wirelessly;

a conversion circuit configured to convert the second signal to a third signal representing a product of the second signal and m;

a first current strength parameter detection circuit configured to detect and to obtain the first signal; and a control signal generating circuit configured to generate the inverter control signal for minimizing a difference between the third signal and the first signal.

Preferably, the control signal generating circuit comprises:

a compensation circuit configured to generate a compensation signal in response to a difference between the third signal and the first signal;

a comparator configured to compare the compensation signal and a triangular wave signal, and to generate a pulse-width modulation signal; and a phase shift control circuit configured to generate the inverter control signal with a phase difference in response to the pulse-width modulation signal, in accordance with the pulse-width modulation signal.

Preferably, the receiver-side control circuit comprises:

a second current strength parameter detection circuit configured to detect and to obtain the second signal;

a second wireless communication circuit configured to transfer the second signal wirelessly;

the transmitter-side control circuit comprising:

a first wireless communication circuit configured to receive the second signal wirelessly;

a first current strength parameter detection circuit configured to detect and to obtain the first signal; and a conversion circuit configured to convert the first signal to a third signal representing a product of the first signal and 1/m;

a control signal generating circuit configured to generate the inverter control signal for minimizing a difference between the second signal and the third signal.

Preferably, the control signal generating circuit comprises:

a compensation circuit configured to generate a compensation signal in response to a difference between the second signal and the third signal;

a comparator configured to compare the compensation signal and a triangular wave signal, and to generate a pulse-width modulation signal; and a phase shift control circuit configured to generate the inverter control signal with a phase difference in response to the pulse-width modulation signal, in accordance with the pulse-width modulation signal.

According to the second aspect, there is provided a power transmitter being coupled to a power receiver comprising a receiving coil in a contactless manner and configured to provide electric energy, comprising:

an inverter circuit configured to receive electric energy and to generate a first AC current with a voltage strength parameter responding to an inverter control signal;

an impedance conversion network configured to receive the first AC current and to generate a second AC current with a current strength parameter corresponding to a voltage strength parameter of the first AC current;

a transmitter-side resonant circuit comprising a transmitting coil which is coupled to the receiving coil in a contactless manner and configured to receive the second AC current; and a transmitter-side control circuit configured to generate an inverter control signal for maintaining a current strength parameter of the second AC current to be m times of a current strength parameter of the third AC current, wherein the third AC current flows through the receiving coil, m is a square root of a ratio of an equivalent resistance of the receiving coil to an equivalent resistance of the transmitting coil, the voltage strength parameter is a voltage peak or an effective value, and the current strength parameter is a current peak or an effective value.

Preferably, the transmitter-side control circuit receives a second signal representing the current strength parameter of the third AC current wirelessly, detects a first signal representing the current strength parameter of the second AC current, and generates the inverter control signal in accordance with the first signal and the second signal.

Preferably, the transmitter-side control circuit comprises:

a first wireless communication circuit configured to receive the second signal wirelessly;

a conversion circuit configured to convert the second signal to a third signal representing a product of the second signal and m;

a first current strength parameter detection circuit configured to detect and to obtain the first signal representing the current strength parameter of the second AC current; and a control signal generating circuit configured to generate the inverter control signal for minimizing a difference between the third signal and the first signal.

Preferably, the control signal generating circuit comprises:

a compensation circuit configured to generate a compensation signal in response to a difference between the third signal and the first signal;

a comparator configured to compare the compensation signal with a triangular wave signal, and to generate a pulse-width modulation signal; and a phase shift control circuit configured to generate the inverter control signal with a phase difference in response to the pulse-width modulation signal, in accordance with the pulse-width modulation signal.

Preferably, the transmitter-side control circuit comprises:

a first wireless communication circuit configured to receive the second signal wirelessly;

a first current strength parameter detection circuit configured to detect and to obtain a first signal representing the current strength parameter of the second AC current;

a conversion circuit configured to convert the first signal to a third signal representing a product of the first signal and 1/m; and a control signal generating circuit configured to generate the inverter control signal for minimizing a difference between the second signal and the third signal.

Preferably, the control signal generating circuit comprises:

a compensation circuit configured to generate a compensation signal in response to a difference between the second signal and the third signal;

a comparator configured to compare the compensation signal and a triangular wave signal, and to generate a pulse-width modulation signal; and a phase shift control circuit configured to generate the inverter control signal with a phase difference in response to the pulse-width modulation signal, in accordance with the pulse-width modulation signal.

According to a third aspect, there is provided a control method for controlling a resonance-type contactless power supply comprising an inverter, an impedance conversion network configured to receive an first AC current and to generate a second AC current with a current strength parameter corresponding to a voltage strength parameter of the first AC current, a transmitting coil and a receiving coil being coupled to each other in a contactless manner, comprising:

controlling the voltage strength parameter of the first AC current from the inverter circuit for maintaining the current strength parameter of the second AC current to be m times of a current strength parameter of a third AC current, wherein the third AC current flows through the receiving coil, m is a square root of a ratio of an equivalent resistance of the receiving coil to an equivalent resistance of the transmitting coil, the voltage strength parameter is a voltage peak or an effective value, and the current strength parameter is a current peak or an effective value.

Preferably, the step of controlling the voltage strength parameter of the first AC current from the inverter circuit for maintaining the current strength parameter of the second AC current to be m times of the current strength parameter of the third AC current comprises:

obtaining a second signal representing the current strength parameter of the third AC current and transferring it in a contactless manner;

receiving the second signal, detecting and obtaining a first signal representing the current strength parameter of the second AC current;

controlling the inverter circuit in accordance with an inverter control signal which is generated in accordance with the first signal and a product of the second signal and m.

Preferably, the step of controlling the voltage strength parameter of the first AC current from the inverter circuit for maintaining the current strength parameter of the second AC current to be m times of the current strength parameter of the third AC current comprises:

obtaining a second signal representing the current strength parameter of the third AC current and transferring it in a contactless manner;

receiving the second signal, detecting and obtaining a first signal representing the current strength parameter of the second AC current; and controlling the inverter circuit in accordance with an inverter control signal which is generated in accordance with a product of the first signal and 1/m and the second signal.

The inverter circuit is controlled to provide a high-frequency AC current with a voltage strength parameter so that a current strength parameter (e.g. a peak value or an effective value of the current) of the AC current flowing through a transmitting coil and that through a receiving coil have a predetermined relationship. Thus, an equivalent load impedance is adjusted so that the system efficiency is optimized.

BRIEF DESCRIPTION OF THE DRAWINGS

The above and other objects, advantages and features of the present disclosure will become more fully understood from the detailed description given hereinbelow in connection with the appended drawings, and wherein.

DETAILED DESCRIPTION OF EMBODIMENTS OF THE DISCLOSURE

Reference will now be made in detail to particular embodiments of the disclosure, it will be understood that the scope of the present disclosure is not limited to these embodiments. Furthermore, in the following detailed description of the present invention, numerous specific details are set forth in order to provide a thorough understanding of the present invention. However, it will be readily apparent to one skilled in the art that the present disclosure may be practiced without these specific details. In other instances, well-known methods, procedures, processes, components, and circuits have not been described in detail so as not to unnecessarily obscure aspects of the present invention.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
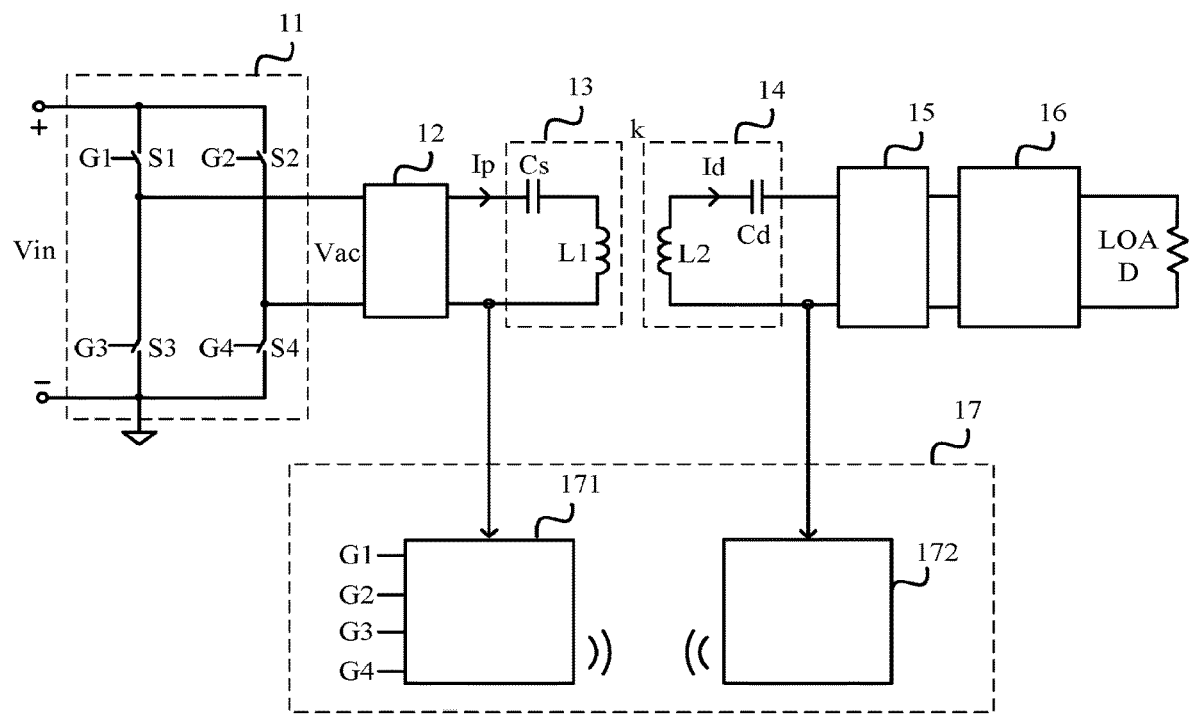
FIG. 1 is a schematic circuit diagram of an example resonance-type contactless power supply according to one embodiment of the present disclosure.

FIG. 1 is a schematic circuit diagram of an example resonance-type contactless power supply according to an embodiment of the present disclosure. As shown in FIG. 1, the resonance-type contactless power supply includes a inverter circuit 11, an impedance conversion network 12, a transmitter-side resonant circuit 13, a receiver-side resonant circuit 14, a rectifier circuit 15 and a DC-DC converter 16 and a control circuit 17.

In the embodiment, the inverter circuit 11, the impedance conversion network 12, and the transmitting-side resonant circuit 13 constitute a power transmitter in the resonance-type contactless power supply 1. The receiver-side resonant circuit 14, the rectifier circuit 15 and the DC-DC converter 16 constitute a power receiver in the resonance-type contactless power supply 1. The control circuit 17 includes a transmitter-side control circuit 171 and a receiver-side control circuit 172. The transmitter-side control circuit 171 is one part of the power transmitter, and the receiver-side control circuit 172 is one part of the power receiver.

The power transmitter and the power receiver are separated from but electrically coupled to each other in a contactless manner by the transmitter-side resonant circuit 13 and the receiver-side resonant circuit 14 to transfer electric energy.

In the embodiment, the contactless power supply may also be referred to as a wireless power supply. That is, the power transmitter and the power receiver are not limited to a specific mode of power transmission by means of conductor connection for transferring electric energy.

The inverter circuit 11 receives electric energy (for example, a DC current Vin) and generates a first AC current Vac with a voltage strength parameter in response to an inverter control signal. In the embodiment, the voltage strength parameter may be a voltage peak or an effective value of a voltage. In the following description, the voltage peak is used as an example of the voltage strength parameter.

The inverter circuit 11 may be a full-bridge inverter circuit, a half-bridge inverter circuit, or other inverter circuit having similar functions.

In FIG. 1, the inverter circuit 11 includes a switching-type full-bridge inverter circuit consisting of a first switch S1, a second switch S2, a third switch S3 and a fourth switch S4. The inverter circuit 11 operates in accordance with the inverter control signals G1 to G4 from the control circuit 17. The inverter control signal G1 to G4 controls the switches S1 to S4, respectively. A DC current is converted to an AC current by turning on and off the first switch S1 and the third switch S3 alternatively, and turning on and off the second switch S2 and the fourth switch S4 alternatively. The first AC current Vac has a frequency which is controlled by the switching frequency of the switches S1 to S4. The switches S1, S3, S2 and S4 are controlled so that the switches S1 and S3 are turned on at a phase difference with the switches S2 and S4 to have a voltage strength parameter of the first AC current Vac. Thus, the voltage strength parameter and the frequency of the first AC current can be controlled by turning on and off the switches S1 to S4 in accordance with the corresponding inverter control signals.

The impedance conversion network 12 receives the first AC current Vac and generates a second AC current Ip. The current strength parameter of the second AC current Ip corresponds to the voltage strength parameter of the first AC current Vac. That is, the current strength parameter of the second AC current is determined by the voltage strength parameter of the first AC current Vac. In the embodiment, the current strength parameter may a current peak or an effective current value of an AC current. In the following description, the voltage peak is used as an example of the voltage strength parameter. Thus, the transmitter-side resonant circuit 13 receives a second AC current Ip with a current peak which is controlled by the inverter control signal. Further, it is equivalent to a circuit in which a constant AC current source is connected to an input port of the transmitter-side resonant circuit 13, and the current peak of the AC current source can be adjusted.

The transmitter-side resonant circuit 13 includes a transmitting coil L1 for receiving the second AC current Ip.

The transmitter-side resonant circuit 13 needs an additional transmitter-side resonance capacitor Cs which is connected in series or in parallel with the transmitting coil L1 to provide a resonance circuit. The transmitter-side resonance capacitor Cs is used for balancing inductive reactance of the transmitting coil L1 in the transmitter-side resonant circuit 13, and inductive reactance due to parasitic parameters of the circuit, eliminating voltage spike and surge current at a high frequency due to the parasitic parameters of the circuit, suppressing electromagnetic interference and power supply noise so as to decrease apparent power of the power supply, and increasing power factor of the power supply. Obviously, one skilled in the art can understand that in some cases, distributed capacitance (for example, among wires of the transmitting coil) of the circuit may be used as the transmitter-side resonance capacitor so that an additional capacitor can be omitted in the circuit.

The receiver-side resonant circuit 14 includes a receiving coil L2. The receiving coil L2 is electrically coupled to the transmitting coil L2 in the transmitter-side resonant circuit 13 in a detachable and contactless manner. The receiver-side resonant circuit 13 receives electric energy from the transmitting coil L1 and generates a third AC current Id.

Meanwhile, the receiver-side resonant circuit 14 needs an additional receiver-side resonant capacitor Cd for decreasing reactive power at a receiver side and increasing active power transferred by the resonance and magnetic coupling circuit. As mentioned above, distributed capacitance (for example, among wires of the coil) of other components in the circuit may be used as the receiver-side resonant capacitor Cd so that an additional capacitor can be omitted in the circuit.

The transmitter-side resonant circuit 13 and the receiver-side resonant circuit 14 constitute the resonance and magnetic coupling circuit.

The rectifier circuit 15 rectifies the third AC current Id to a DC current.

The DC-DC converter 16 converts the DC current from the rectifier circuit 15 to a constant current or a constant voltage corresponding to load requirements and supplies it to the load LOAD. It should be understood that in some cases, the DC-DC converter 16 is not necessary and the rectifier circuit 15 can be directly coupled to the load.

The rectifier circuit 15, the DC-DC converter 16 and the load are cascaded to form a cascade circuit which is equivalent to a load RL in the receiver-side resonant circuit 14.

Figure 2:
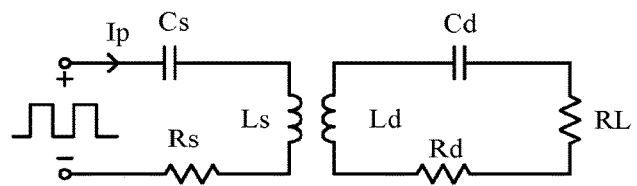
FIG. 2 is an equivalent circuit diagram of a resonance and magnetic coupling circuit in the example resonance-type contactless power supply according to one embodiment of the present disclosure.

FIG. 2 is an equivalent circuit diagram of a resonance and magnetic coupling circuit, i.e. a combination of a transmitter-side resonant circuit 13 and a receiver-side resonant circuit 14, in the example resonance-type contactless power supply according to one embodiment of the present disclosure.

As shown in FIG. 2, the transmitting coil L1 is equivalent to a first ideal coil Ls and a coil resistor Rs, and the receiving coil L2 is equivalent to a second ideal coil Ls and a coil resistor Rd. The first ideal coil Ls is coupled to the second ideal coil Ld. In FIG. 2, the transmitter-side resonant circuit 13 and the receiver-side resonant circuit 14 are each series resonance circuits. The transmitter-side resonant circuit 13 further includes a transmitter-side resonance capacitor Cs, and the receiver-side resonant circuit 121 further includes a receiver-side resonant capacitor Cd. As mentioned above, the transmitter-side resonance capacitor Cs and the receiver-side resonant capacitor Cd may be achieved by additional components or distributed parameters of other components.

Thus, the resonance and magnetic coupling circuit constitutes a mutual-inductance coupling circuit.

Typically, the transmitter-side resonant circuit 13 and the receiver-side resonant circuit 14 have the same resonance frequency so that electric energy can be transferred in a resonant manner as follows, $$fs=1/2\pi \cdot \sqrt{Ls \cdot Cs}=1/2\pi \cdot \sqrt{Ld \cdot Cd}=fd$$

wherein fs is a resonance frequency of the transmitter-side resonant circuit 13, fd is a resonance frequency of the receiver-side resonant circuit 14, Ls is an inductance value of the first ideal coil Ls, Ld is an inductance value of the second ideal coil Ld, Cs is a capacitance value of the transmitter-side resonance capacitor, and Cd is a capacitance value of the receiver-side resonant capacitor.

Preferably, the inductance value of the first ideal coil Ls may be set to be equal to the inductance value of the second ideal coil Ld, and the capacitance value Cs of the transmitter-side resonance capacitor may be set to be equal to the capacitance value Cd of the receiver-side resonant capacitor so that the receiver-side resonant capacitor 13 and the receiver-side resonant circuit 14 have the same resonance frequency.

Typically, the above resonance frequency is referred to as a self-inductance resonance frequency. When operating at the above resonance frequency, the transmitter-side resonant capacitor 13 and the receiver-side resonant circuit 14 resonate simultaneously, and impedances of inductors and capacitors in the resonance and magnetic coupling circuit are canceled out. The system efficiency is thus optimized.

Figure 3:
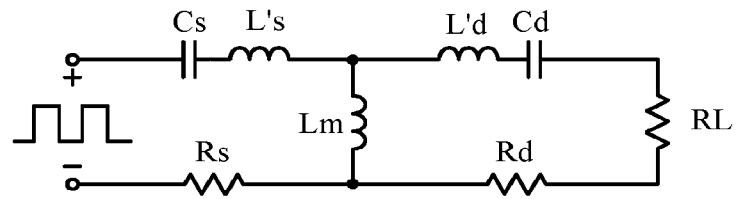
FIG. 3 is an equivalent circuit diagram of a resonance and magnetic coupling circuit in a decoupling state in the example resonance-type contactless power supply according to one embodiment of the present disclosure.

FIG. 3 is an equivalent circuit diagram of a resonance and magnetic coupling circuit in a decoupling state in the example resonance-type contactless power supply according to one embodiment of the present disclosure. As shown in FIG. 3, because the coupling of the transmitting coil L1 and the receiving coil L2 includes leakage inductance and mutual inductance, the resonance and magnetic coupling circuit as shown in FIG. 2 can be equivalent to the circuit as shown in FIG. 3, where the ideal coils Ls and Ld are coupled to each other but represented here by transmitter-side leakage inductance Ls', receiver-side leakage inductance Ld', and mutual inductance Lm. Accordingly, the resonance and magnetic coupling circuit as shown in FIG. 2 may be further equivalent to a two-port network as shown in FIG. 3.

Figure 4:
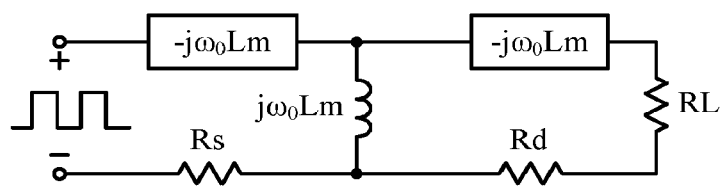
FIG. 4 is a schematic diagram showing parameters of the equivalent circuit in FIG. 3 when operating at a self-inductance resonance frequency.

FIG. 4 is a schematic diagram showing parameters of the equivalent circuit in FIG. 3 when operating at a self-inductance resonance frequency. As shown in FIG. 4, a series circuit of the transmitter-side leakage inductance Ls' and the transmitter-side resonance capacitor Cs has an equivalent impedance $-j\omega_0 Lm$ when the transmitter-side resonant circuit 13 provides an AC current Ip with a self-inductance resonance frequency $\omega_0$. Thus, the impedance of the mutual inductance can be canceled out. An input port of the power transmitter has minimized impedance, and the transmitter-side resonant circuit resonates. Meanwhile, a series circuit of the receiver-side leakage inductance Ld' and the receiver-side resonant capacitor Cd has an equivalent impedance $-j\omega_0 Lm$, so that an output port of the power receiver has a minimized impedance, and the receiver-side resonant circuit resonates.

Here, the system efficiency $\eta$ is given as follows, $$\eta = \frac{RL}{Rs\left[\left(\frac{RL+Rd}{\omega_0 Lm}\right)^2\right] + RL + Rd}$$

where RL is an equivalent load impedance.

According to the above equation, when the system operates at maximum efficiency, the equivalent load impedance satisfies the following equation, $$U = \frac{\omega Lm}{\sqrt{RsRd}} = k\sqrt{QsQd}$$

where k is a coupling coefficient, Qs and Qd are each quality factors of the transmitting coil and the receiving coil. Here, a quality factor of a reactance element is equal to the ratio of the impedance to the equivalent resistance of the reactance element. Typically, the U in the above equation is much larger than 1 when Qs and Qd are both larger than 100.

Thus, when the system operates at the maximum efficiency, the equivalent load impedance needs to satisfy the following equation, $$RL \approx RdU = \omega Lm\sqrt{\frac{Rd}{Rs}}$$

Figure 5:
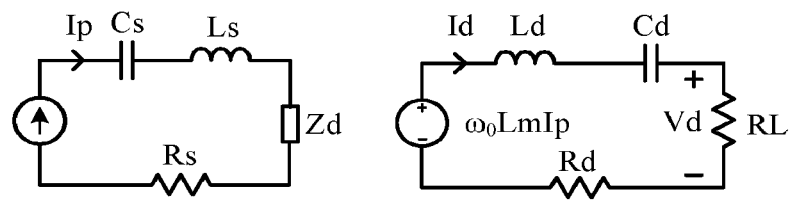
FIG. 5 is an equivalent circuit diagram of a resonance and magnetic coupling circuit having another structure in the example resonance-type contactless power supply according to one embodiment of the present disclosure.

FIG. 5 is an equivalent circuit diagram of a resonance and magnetic coupling circuit having another structure in the example resonance-type contactless power supply according to one embodiment of the present disclosure. In the resonance and magnetic coupling circuit according to the embodiment, the circuits connected at the input terminal of the transmitter-side resonant circuit 13 are equivalent to a AC current source with a constant current peak. According to current-voltage relationship due to mutual inductance coupling, the receive-side resonant circuit generates a AC current with a constant voltage peak by mutual inductance coupling when the AC current with a constant current peak is fed to the transmitter-side resonant circuit. Thus, the transmitter-side circuit is equivalent to an AC voltage source at the input terminal of the receiver-side circuit, which provides a AC current with a voltage equal to $\omega_0 LmIp$. Meanwhile, the receiver-side circuit and the load are equivalent to a reflection impedance Zd connected at the output terminal of the transmitter-side terminal.

The receiver-side circuit provides a voltage approximately equal to $\omega_0 LmIp$ in the equivalent circuit shown in FIG. 5. Thus, when operating at the self-inductance resonance frequency, the system has an optimal efficiency and the AC current Id from the receiver-side circuit satisfies the following equation, $$Id = \frac{Ud}{RL} \approx \frac{\omega LmIp}{\omega Lm\sqrt{\frac{Rd}{Rs}}}$$

Furthermore, Ip=mId, $$m = \sqrt{\frac{Rd}{Rs}}.$$

From the above equations, it can be understood that the receiver-side equivalent load impedance becomes optimal so that the system operates at an optimal efficiency if the current strength parameters of the second AC current of the transmitter-side resonant circuit and the third AC current of the receiver-side resonant circuit have a predetermined relationship.

The control circuit 17 according to the embodiment generates the inverter control signal G1 to G4 for maintaining the current strength parameter of the second AC current Ip to be m times larger than that of the third AC current Id on the basis of the above principles. The second AC current flows through the transmitting coil. The third AC current flows through the receiving coil. m is a square root of a ratio of the equivalent resistance of the receiving coil to the equivalent resistance of the transmitting coil. The current strength parameter may be a current peak or an effective value of the current.

Specifically, the control circuit 17 includes a transmitter-side control circuit 171 and a receiver-side control circuit 172.

The receiver-side control circuit 172 obtains a second signal V2 representing the current strength parameter of the third AC current and transfers it.

The transmitter-side control circuit 171 receives the second signal V2, detects a first signal V1 representing the current strength parameter of the second AC current, and generates the inverter control signal G1 to G4 in accordance with the first signal V1 and the second signal V2.

Figure 6:
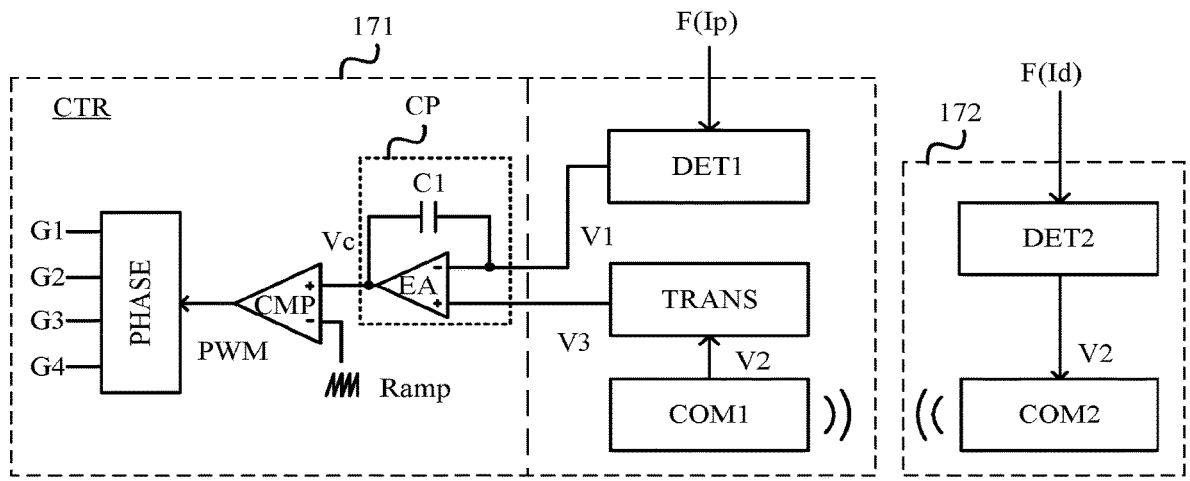
FIG. 6 is a schematic circuit diagram of a control circuit according to one embodiment of the present disclosure.

FIG. 6 is a schematic circuit diagram of a control circuit according to one embodiment of the present disclosure. As shown in FIG. 6, the receiver-side control circuit 172 includes a second current strength parameter detection circuit DET2 and a second wireless communication circuit COM2.

The second current strength parameter detection circuit DET2 detects the third AC current Id or a sampling signal F(Id) of the third AC current to obtain the second signal V2 representing the current strength parameter of the third AC current.

The second wireless communication circuit COM2 transfers the second signal wirelessly. The wireless manner can be radio communication, optical communication or other communication approaches.

The transmitter-side control circuit 171 includes a first wireless communication circuit COM1, a conversion circuit TRANS, a first current strength parameter detection circuit DET1 and a control signal generating circuit CTR.

The first wireless communication COM1 receives the second signal V2 wirelessly.

The conversion circuit TRANS converts the second signal V2 to the third signal V3, wherein the third signal represents a product of the second signal V2 and m, that is, V3=V2*m. Rs and Rd are both fixed values, so m is also a fixed value. Preferably, the conversion circuit TRANS may be a multiplier.

The first current strength parameter detection circuit DET1 detects the second AC current Ip or the sampling signal F(Ip) of the second AC current to obtain the first signal V1 representing the current strength parameter of the second AC current.

The control signal generating circuit CTR generates the inverter control signals G1 to G4 for minimizing a difference between the third signal V3 and the first signal V1.

Specifically, the control signal generating circuit CTR includes a compensation circuit CP, a comparator CMP and a phase shift control circuit PHASE.

The compensation circuit CP generates a compensation signal in response to a difference V3-V1 between the third signal V3 and the first signal V1. As shown in FIG. 6, the compensation circuit may include an error amplifier EA and a compensation capacitor C1.

The comparator CMP compares the compensation signal Vc with a triangular wave signal Ramp, and generates a pulse-width modulation signal PWM.

The phase shift control circuit PHASE provides the inverter control signals G1 to G4 with the phase differences responding to the pulse-width modulation signal PWM.

It should be understood that when Rs=Rd, m is equal to 1, and the conversion circuit TRANS in the transmitter-side control circuit 171 can be omitted in such a case.

Here, the first signal V1 and the second signal V2 are fed into the control signal generating circuit CTR which generates the inverter control signals G1 to G4 for minimizing the difference between the second signal and the first signal.

Figure 7:
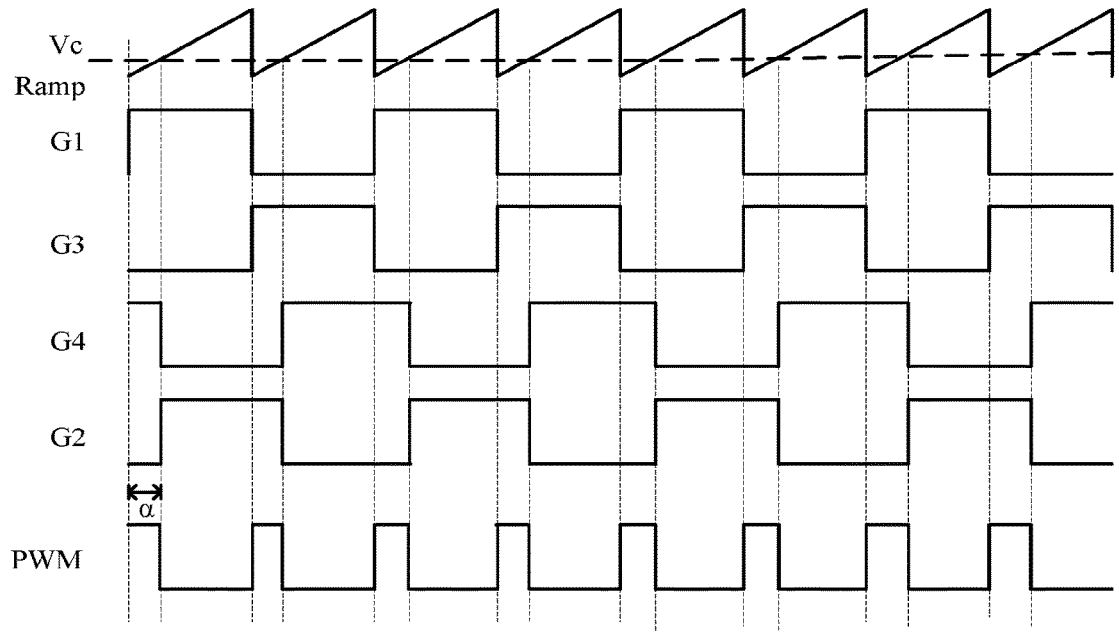
FIG. 7 is anoperating waveform diagrams of a control circuit according to one embodiment of the present disclosure.

FIG. 7 is an operating waveform diagram of a control circuit according to one embodiment of the present disclosure. As shown in FIG. 7, the phase differences a between the inverter control signals G2 and G1, and the phase difference a between the inverter control signals G4 and G3 are defined in the current cycle by a high level part of the pulse-width modulation signal. The high level part of the pulse-width modulation signal is determined by a time period during which the triangular wave signal Ramp is smaller than the compensation signal Vc. The inverter control signals with this phase difference control the voltage peak of the first AC current from the inverter circuit 11, so that the current strength parameters of the second AC current and the third AC current have a predetermined relationship and the resonance-type contactless power supply maintains the power parameter close to a minimum value, so that the system operates at optimal efficiency.

Figure 8:
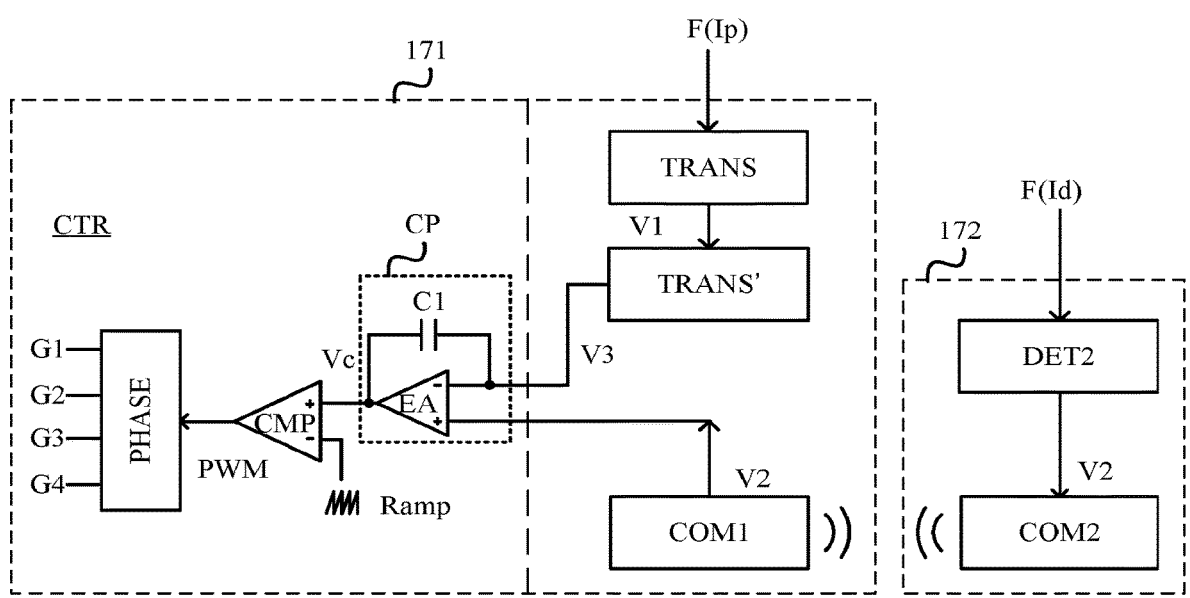
FIG. 8 is a schematic circuit diagram of a control circuit according to one embodiment of the present disclosure.

FIG. 8 is a schematic circuit diagram of a control circuit according to one embodiment of the present disclosure. As shown in FIG. 8, the receiver-side control circuit 172 is same with the receiver-side control circuit in FIG. 6, and will not be further describe here.

The transmitter-side control circuit 171 includes a first wireless communication circuit COM1, a conversion circuit TRANS', a first current strength parameter detection circuit DET1 and a control signal generating circuit CTR.

The first wireless communication COM1 receives the second signal V2 wirelessly.

The first current strength parameter detection circuit DET1 detects the second AC current Ip or the sampling signal F(Ip) of the second AC current to obtain the first signal V1 representing the current strength parameter of the second AC current.

The conversion circuit TRANS' converts the first signal V1 to the third signal V3, wherein the third signal represents the product of the second signal V2 and 1/m. That is, V3=V1/m. Rs and Rd are both fixed values, so that m is also a fixed value. Preferably, the conversion circuit TRANS' may be a multiplier.

It should be understood that when Rs=Rd, m is equal to 1, and the conversion circuit TRANS in the transmitter-side control circuit 171 can be omitted under the condition.

The control signal generating circuit CTR generates the inverter control signals G1 to G4 for minimizing a difference between the third signal V2 and the first signal V3.

Specifically, the control signal generating circuit CTR may include a compensation circuit CP, a comparator CMP and a phase shift control circuit PHASE.

The compensation circuit CP generates a compensation signal in response to a difference V2-V3 between the second signal V2 and the third signal V3. As shown in FIG. 8, the compensation circuit may include an error amplifier EA and a compensation capacitor C1.

The comparator CMP compares the compensation signal Vc with a triangular wave signal Ramp, and generates a pulse-width modulation signal PWM.

The phase shift control circuit PHASE provides the inverter control signals G1 to G4 with the phase differences responding to the pulse-width modulation signal.

The first signal has better quality because it is not transferred wirelessly. Thus, in the embodiment, the first signal is converted for ensuring the control accuracy.

Figure 9:
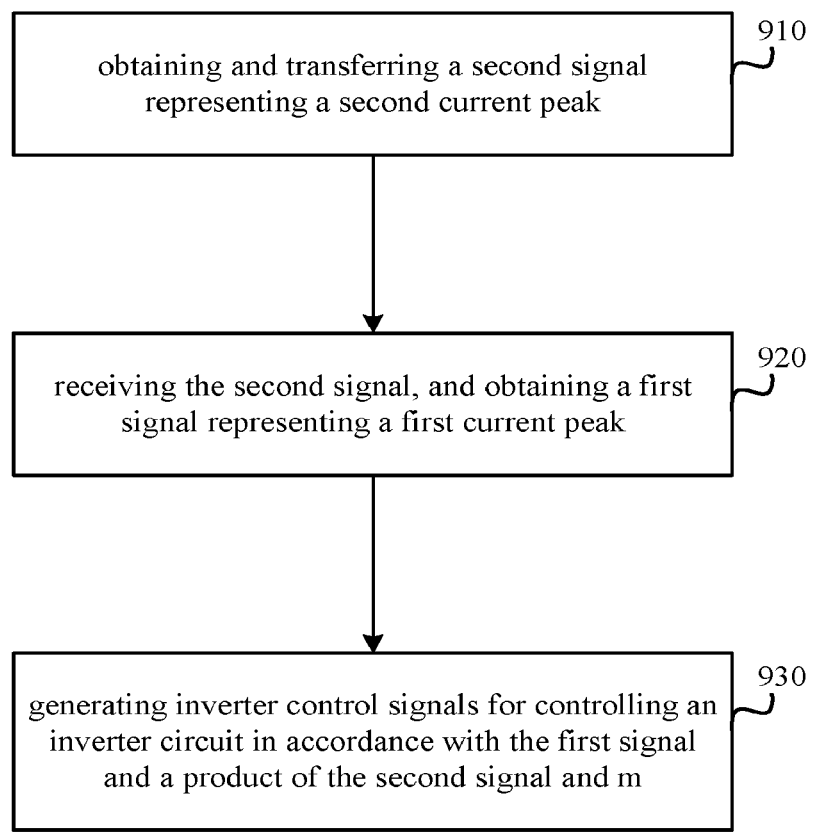
FIG. 9 is a flow chart of an example control method according to one embodiment of the present disclosure.

FIG. 9 is a flow chart of an example control method according to one embodiment of the present disclosure. The control method shown in FIG. 9 is performed by the controller 17. Referring to FIG. 9, the method includes controlling a voltage peak of a high-frequency AC current from the inverter circuit so that the current strength parameter of the second AC current is m times larger than the current strength parameter of the third AC current, wherein the second AC current flows through the transmitting coil, the third AC current flows through the receiving coil, m is a square root of a ratio of the equivalent resistance of the receiving coil to the equivalent resistance of the transmitting coil, the voltage strength parameter is a voltage peak or an effective value of a voltage, and the current strength parameter is a current peak or an effective value.

The step of controlling the voltage peak of the high-frequency AC current from the inverter circuit so that the current strength parameter of the second AC current is m times larger than the current strength parameter of the third AC current includes the following steps.

In step 910, the process obtains and transfers the second signal representing the current strength parameter of the third AC current.

In step 920, the process obtains the second signal, detects the first signal representing the current strength parameter of the second AC current.

In step 930, the inverter circuit is controlled in accordance with the inverter control signal which is generated in accordance with the first signal and the product of the second signal and m.

The step 930 may be replaced by step 930'. In step 930', the inverter circuit is controlled in accordance with the inverter control signal generated by the product of the first signal and 1/m, and the second signal.

The inverter circuit is controlled to provide a high-frequency AC current with a voltage strength parameter so that the current strength parameters (e.g. a peak value or effective value of the current) of the AC current flowing through the transmitting coil and through the receiving coil have a predetermined relationship. Thus, an equivalent load impedance is adjusted so that the system efficiency is optimized.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

What is claimed is:

1. A resonance-type contactless power supply comprising:
   an inverter circuit configured to receive electric energy and to generate a first AC current with a voltage strength parameter responding to an inverter control signal;
   an impedance conversion network configured to receive said first AC current and to generate a second AC current with a current strength parameter corresponding to a voltage strength parameter of said first AC current;
   a transmitter-side resonant circuit comprising a transmitting coil for receiving said second AC current;
   a receiver-side resonant circuit comprising a receiving coil which is separated from but electrically coupled to said transmitting coil in a contactless manner, and configured to receive electric energy from said transmitting coil and to generate a third AC current; and
   a control circuit configured to generate said inverter control signal for maintaining said current strength parameter of said second AC current to be m times a current strength parameter of said third AC current, wherein m is a square root of a ratio of an equivalent resistance of said receiving coil to an equivalent resistance of said transmitting coil, said voltage strength parameter is a voltage peak or an effective value, and said current strength parameter is a current peak or an effective value,
   wherein said control circuit comprises a control signal generating circuit having a compensation circuit configured to generate a compensation signal based on said second and third AC currents, a comparator configured to generate a pulse-width modulation (PWM) signal by comparing said compensation signal against a triangular wave signal, and a phase shift control circuit configured to generate said inverter control signal with a phase difference in accordance with said PWM signal.

2. The resonance-type contactless power supply according to claim 1, wherein said control circuit comprises:
   a receiver-side control circuit configured to obtain a second signal representing said current strength parameter of said third AC current and to transfer it in a contactless manner; and
   a transmitter-side control circuit configured to receive said second signal, to detect a first signal representing said current strength parameter of said second AC current, and to generate said inverter control signal in accordance with said first signal and said second signal.

3. The resonance-type contactless power supply according to claim 2, wherein said receiver-type control circuit comprises:
   a second current strength parameter detection circuit configured to detect and to obtain said second signal;
   a second wireless communication circuit configured to transfer said second signal wirelessly;
   said transmitter-side control circuit comprising:
   a first wireless communication circuit configured to receive said second signal wirelessly;
   a conversion circuit configured to convert said second signal to a third signal representing a product of said second signal and m; and
   a first current strength parameter detection circuit configured to detect and to obtain said first signal,
   wherein said control signal generating circuit is configured to generate said inverter control signal for minimizing a difference between said third signal and said first signal.

4. The resonance-type contactless power supply according to claim 3, wherein said
   compensation circuit is configured to generate said compensation signal in response to a difference between said third signal and said first signal.

5. The resonance-type contactless power supply according to claim 2, wherein:
   said receiver-type control circuit comprises:
   a second current strength parameter detection circuit configured to detect and to obtain said second signal;
   a second wireless communication circuit configured to transfer said second signal wirelessly; and
   said transmitter-side control circuit comprises:
   a first wireless communication circuit configured to receive said second signal wirelessly;
   a first current strength parameter detection circuit configured to detect and to obtain said first signal; and
   a conversion circuit configured to convert said first signal to a third signal representing a product of said first signal and 1/m,
   wherein said control signal generating circuit is configured to generate said inverter control signal for minimizing a difference between said second signal and said third signal.

6. The resonance-type contactless power supply according to claim 5, wherein said
   compensation circuit is configured to generate said compensation signal in response to a difference between said second signal and said third signal.

7. A power transmitter being coupled to a power receiver comprising a receiving coil in a contactless manner and configured to provide electric energy, comprising:

an inverter circuit configured to receive electric energy and to generate a first AC current with a voltage strength parameter responding to an inverter control signal;

an impedance conversion network configured to receive said first AC current and to generate a second AC current with a current strength parameter corresponding to a voltage strength parameter of said first AC current;

a transmitter-side resonant circuit comprising a transmitting coil which is coupled to said receiving coil in a contactless manner and configured to receive said second AC current; and a transmitter-side control circuit configured to generate an inverter control signal for maintaining a current strength parameter of said second AC current to be m times a current strength parameter of said third AC current, wherein said third AC current flows through said receiving coil, m is a square root of a ratio of an equivalent resistance of said receiving coil to an equivalent resistance of said transmitting coil, said voltage strength parameter is a voltage peak or an effective value, and said current strength parameter is a current peak or an effective value, wherein said transmitter-side control circuit comprises a control signal generating circuit having a compensation circuit configured to generate a compensation signal based on said second and third AC currents, a comparator configured to generate a pulse-width modulation (PWM) signal by comparing said compensation signal against a triangular wave signal, and a phase shift control circuit configured to generate said inverter control signal with a phase difference in accordance with said PWM signal.

8. The power transmitter according to claim 7, wherein said transmitter-side control circuit receives a second signal representing said current strength parameter of said third AC current wirelessly, detects a first signal representing said current strength parameter of said second AC current, and generates said inverter control signal in accordance with said first signal and said second signal.

9. The power transmitter according to claim 8, wherein said transmitter-side control circuit comprises:
a first wireless communication circuit configured to receive said second signal wirelessly;
a conversion circuit configured to convert said second signal to a third signal representing a product of said second signal and m; and
a first current strength parameter detection circuit configured to detect and to obtain said first signal representing said current strength parameter of said second AC current,
wherein said control signal generating circuit is configured to generate said inverter control signal for minimizing a difference between said third signal and said first signal.

10. The power transmitter according to claim 9, wherein said
compensation circuit is configured to generate said compensation signal in response to a difference between said third signal and said first signal.

11. The power transmitter according to claim 7, wherein said transmitter-side control circuit comprises:
a first wireless communication circuit configured to receive said second signal wirelessly;

a first current strength parameter detection circuit configured to detect and to obtain a first signal representing said current strength parameter of said second AC current;
a conversion circuit configured to convert said first signal to a third signal representing a product of said first signal and 1/m; and
a control signal generating circuit configured to generate said inverter control signal for minimizing a difference between said second signal and said third signal.

12. The power transmitter according to claim 11, wherein said
compensation circuit is configured to generate said compensation signal in response to a difference between said second signal and said third signal.

13. A control method for controlling a resonance-type contactless power supply comprising an inverter circuit, an impedance conversion network configured to receive a first AC current and to generate a second AC current with a current strength parameter corresponding to a voltage strength parameter of said first AC current, a transmitting coil and a receiving coil being coupled to each other in a contactless manner, the method comprising:
controlling said voltage strength parameter of said first AC current from said inverter circuit for maintaining said current strength parameter of said second AC current to be m times a current strength parameter of a third AC current, wherein said third AC current flows through said receiving coil, m is a square root of a ratio of an equivalent resistance of said receiving coil to an equivalent resistance of said transmitting coil, said voltage strength parameter is a voltage peak or an effective value, and said current strength parameter is a current peak or an effective value;
obtaining a first signal representing said current strength parameter of said second AC current and a second signal representing said current strength parameter of said third AC current;
generating a compensation signal based on said second and third AC currents;
generating a pulse-width modulation (PWM) signal by comparing said compensation signal against a triangular wave signal; and
generating said inverter control signal with a phase difference in accordance with said PWM signal.

14. The control method according to claim 13, wherein said step of controlling said voltage strength parameter of said first AC current from said inverter circuit for maintaining said current strength parameter of said second AC current to be m times of said current strength parameter of said third AC current comprises:
obtaining a second signal representing said current strength parameter of said third AC current and transferring it in a contactless manner;
receiving said second signal, detecting and obtaining a first signal representing said current strength parameter of said second AC current; and
controlling said inverter circuit in accordance with an inverter control signal which is generated in accordance with said first signal and a product of said second signal and m.

15. The control method according to claim 13, wherein said step of controlling said voltage strength parameter of said first AC current from said inverter circuit for maintaining said current strength parameter of said second AC current to be m times of said current strength parameter of said third AC current comprises:

obtaining a second signal representing said current strength parameter of said third AC current and transferring it in a contactless manner;

receiving said second signal, detecting and obtaining a first signal representing said current strength parameter of said second AC current; and controlling said inverter circuit in accordance with an inverter control signal which is generated in accordance with a product of said first signal and 1/m and said second signal.

* * * * *